United States Patent Office 3,567,824
Patented Mar. 2, 1971

3,567,824
NON-SLUDGING DIMETHYL - 1,2-DIBROMO-2,2-DICHLOROETHYL PHOSPHATE-FUEL OIL COMPOSITIONS
Joseph E. Moore, Richmond, Calif., assignor to Chevron Research Company, San Francisco, Calif.
No Drawing. Filed Feb. 15, 1965, Ser. No. 432,868
Int. Cl. A01n 9/00; C10l 1/26
U.S. Cl. 424—225       3 Claims

ABSTRACT OF THE DISCLOSURE

Pesticidal compositions comprising dimethyl-1,2-dibromo-2,2-dichloroethyl phosphate, fuel oil and a salt of the reaction product obtained by reacting at a temperature between 300–415° F. an aliphatic monocarboxylic acid having between 14–18 carbon atoms with a polyalkylene polyamine having one more nitrogen atom per molecule than there are alkylene groups in the molecule, in a molar proportion of acid to amine varying between about 1:1 and X:1, X representing the number of nitrogen atoms in the polyalkylene polyamine reactant. The salt inhibits sludge formation in the composition.

---

This invention relates to novel pesticidal compositions. Particularly, it relates to non-sludging organic phosphate pesticide-fuel oil compositions.

A large number of organic phosphorus containing compounds, such as parathion (O,O-diethyl O-p-nitrophenyl thiophosphate), methyl parathion (O,O-dimethyl O-p-nitrophenyl thiophosphate), and naled (dimethyl-1,2-dibromo-2,2-dichloroethyl phosphate), are well known as being highly effective in controlling mosquitoes, flies and other pests. The insecticides of this type are most conveniently distributed in large quantities by a method called "thermal aerosol fogging." Briefly, this distribution technique involves admixing the insecticide with an inexpensive fuel oil, vaporizing the insecticide-fuel oil mixture with steam or heated gas and ejecting the vaporized mixture as a fog or mist over a desired area.

The thermal aerosol fogging method, although widely used, has several disadvantages. When employed to spread organic phosphorus insecticides, frequent shut downs are encountered due to the gumming and clogging of lines, valves, spray nozzles and solenoids. Usually this clogging and gumming is caused by sludge deposits formed from the insecticide-fuel oil composition. The formation of such sludge is particularly notorious in naled-fuel oil mixtures and even more particularly to mixtures stored in tanks exposed to moisture. Apparently the moisture, which condenses and becomes incorporated into the insecticidal composition, increases the likelihood of sludge formation. Hence, distribution by the fogging technique is severely hampered in these instances.

Naled-fuel oil mixtures are also commonly applied from aircraft without further treatment, i.e., without the benefit of the thermal fogging technique. In these cases, the operation is severely hampered by fouling of tanks and plugging of lines, making spraying difficult or stopping the operation entirely.

Previously, surface active agents, such as lecithin and alkali and alkaline earth metal salts of oil soluble petroleum sulfonates, have been used to stabilize insecticide-fuel oil compositions and prevent sludge formation. However, it was found that lecithin and the commercially available petroleum sulfonate stabilizers did not sufficiently prevent the formation of sludge in naled-fuel oil compositions. They were particularly ineffective in preventing the formation of sludge in mixtures which had been exposed to moisture. Therefore, these surface active compounds afforded little prevention of clogging and frequent shut downs in the fogging apparatus.

It has now been found that small amounts of a salt of the reaction product of an aliphatic carboxylic acid and a polyalkylene polyamine stabilize and prevent sludge formation in naled-fuel oil mixtures. This stabilized non-sludging composition may be used in any fogging apparatus commercially available or to prevent the formation of sludge in aircraft tanks and lines.

The reaction products used in this invention are obtained by reacting, at a temperature between 300 and 415° F. an aliphatic monocarboxylic acid with a polyalkylene polyamine having one more nitrogen atom per molecule than there are alkylene groups in the molecule, in a molar proportion varying between about 1:1, respectively, and about X:1, respectively, X representing the number of nitrogen atoms in the polyalkylene polyamine reactant.

The aliphatic monocarboxylic acid reactant contemplated herein is an acid, acid halide or anhydride containing between about 14 to 18 carbons. It may be branch-chained or straight-chained. Examples of suitable acid reactants are oleic acid, pentadecanoic acid, palmitic acid, margaric acid, stearic acid, linoleic acid, dihydroxy stearic acid, elaidoyl chloride and heptacosanoic anhydride.

The polyalkylene polyamine reactants used herein have the structural formula

$$H_2N(RNH)_nH$$

where R is an alkylene radical or a hydrocarbon radical-substituted alkylene radical, and $n$ is an integer between about 2 and about 6. Due to their greater commercial availability the polyethylene polyamines are particularly preferred. Illustrative of the preferred compounds are tetraethylene pentamine and triethylene tetramine.

The reaction product is generally a combination of linear amides and amides containing the imidazoline structure. Preferably, the reaction product is composed of between about 50 to 100% amides containing the imidazoline structure. The salts of the above-described reaction products are obtained by acidifying the reaction products with a long chain fatty acid. Illustrative of fatty acids which may be used for this purpose are oleic acid, stearic acid and tall oils.

The salts of the amide reaction products are usually admixed with the fuel oil before the pesticide is added. Any known means for mixing compatible liquids is appropriate. Although it is not necessary, the salt may be initially solved in a suitable solvent such as high boiling aromatic solvents to facilitate homogeneous dispersion into the fuel oil.

In general, any commercially available inexpensive fuel oil, such as diesel fuels, cycle oils or fuel oils may be used. Petroleum distillates which have an end boiling point not exceeding 700° F. and preferably below 675° F. for use as diesel fuel are examples of suitable types of oil for use in this invention.

Conveniently, the pesticide is then added to the fuel oil containing the surface active agent. The resulting non-sludging insecticidal composition comprises a fuel oil, from about 0.5–5 volume percent naled, preferably about 1 volume percent, and from about 0.25–2.5 volume percent of the surface active agent, preferably about 0.5 volume percent.

The following examples illustrate but do not limit the invention.

EXAMPLE 1

To 1.50 gms. of a reaction product prepared by reacting at a temperature from 300–415° F. tetraethylene pentamine with $C_{17}H_{35}$—COOH in a mol ratio of amine to acid of 1:3, and having 50–100% imidazoline forma- For the clinical application, the concentration of the solution is desired to be 25~35 w./v. percent as silver fluoride. This may be adjusted by using previously calculated amounts of the starting materials. Alternatively, there may be prepared a solution of a higher concentration, and diluted to the above defined concentration.

On the other hand, the preferred pH range of the objective solution is from 6.5~9.5. At a lower pH silver is apt to be isolated and precipitated, and at a higher pH, an unfavorable irritation against gum is caused and an ammoniac odor is emphasized.

The thus prepared silver ammonia fluoride solution is useful for the prevention of dental caries, the protective coating of dentine, and the treatment of various dental diseases such as hypersensitivity, apthous stomatitis, pyorrhea and a small bleeding. It is particularly advantageous in neither serious blackening nor erosion of teeth is encountered. For example, the treatment of dentine hypersensitivity can be carried out according to the following procedures: (1) the affected part is washed with 3 w./v. percent hydrogen peroxide solution; (2) the affected tooth is segregated with roll cottons; (3) the segregated tooth is dried with warm air; (4) the silver ammonia fluoride solution is applied to the affected tooth with a cotton pellet and left for 3~4 minutes; and (5) the segregating cottons are taken off and the mouth is rinsed out. This treatment is repeated 3~4 times at intervals of a few days. The clinical effect for 45 cases of the hypersensitivity was determined by tactile and thermal test, and the result is shown in the following table:

Table. Effect of Silver Ammonia Flouride on Hypersensitivity.

|  | Tactile test, percent | Thermal test, percent |
| --- | --- | --- |
| Excellent effect | 68.8 | 80.0 |
| Considerable effect | 8.8 | 6.6 |
| No effect | 22.2 | 13.3 |

As apparent from the table, the silver ammonium fluoride solution of the present invention is highly effective for the treatment of the hypersensitivity. The applications of the solution for the other purposes can be achieved in a similar manner to the above mentioned procedures.

In another aspect of the present invention, it relates also to a mouthpiece device holding the above described silver ammonia fluoride solution. More particularly, the invention relates to a mouthpiece device for the prevention of dental caries, and threatment of dental diseases, such as hypersensitivities, apthous stomatitis and pyorrhea, which comprises a horseshoe shaped body being made of a spongy material permeable to water and being saturated with a silver ammonia fluoride solution and a coating of the outer perimeter excluding at least either the top or bottom of the body, the said coating being impermeable to water. The said body may have in at least either the top or bottom a trough arranged and adapted to the patient's upper or lower teeth and gum.

In the accompanying drawing:

FIG. 1 is a plane view of a device constructed to embody the preferred teaching of the invention;

FIG. 2 is a perspective view of such device; and

FIG. 3 is a vertical sectional view drawn on the line A—A of FIG. 1.

The mouthpiece of the present invention has a horseshoe shaped configuration so as to follow the alveolar processes of the patient. The body 11 is made of a spongy material being permeable to water so as to be saturated with a silver ammonia fluoride. Examples of such a spongy material include sponge, spongy gum and a plastic foam (e.g. polyurethane foam). In at least either the top or bottom of the body 11, there may be, but not necessarily, located a trough 12, which is arranged and adapted to the upper or lower teeth and gum of the patient so as to well invest the affected part. The outer perimeter excluding at least either the top or bottom which is intended to be brought in contact with the affected part is covered with a coating 13. The coating is made of a substance being impermeable to water so that the treating solution is well held in the body. As illustrative of the substance for the coating are paraffin, wax, paraffin paper, silicone and various plastic films. For the convenience of introduction of the mouthpiece into the patient's mouth, the thickness of the body may be made thinner from the front to the back. When the mouthpiece is applied, the treating solution is exuded to the affected teeth from the uncoated surface of the body by biting force exerted by the patient's jaws. Because the body is made of a spongy substance, the mouthpiece of the present invention can be easily brought in complete contact with the affected part of the patient without fine arrangement. Further, because the mouthpiece device has a more simplified structure than those ever known or used, it can be manufactured with unexpensive cost. Thus, it might be thrown away on each treatment so that troublesome sterilization is no longer necessary.

The following examples will illustrate the present invention more specifically. But, it is to be understood that they are presented for the purpose of illustration only and not of limitation. In the examples, percentages are set forth by weight per volume percentage. The abbreviations have conventional significances.

EXAMPLE 1

To 30% percent silver fluoride solution (100 ml.) is added ammonium fluoride (2 g.) and adjusted to pH 8.5 by introduction of gaseous ammonia under cooling. After removal of insoluble materials by filtration, the solution is filled and preserved in a light-resistant container.

EXAMPLE 2

To a solution of silver nitrate (53.5 g.) in water (30 ml.) is added another solution of anhydrous sodium carbonate (34 g.) in water (100 ml.) while stirring. Silver carbonate precipitated is collected by filtration, and washed twice with water (each 30 ml. portion). Thus prepared silver carbonate is added to 40% hydrofluoric acid (50 ml.), and the mixture is stirred for a while, whereby silver carbonate is dissolved out with generation of carbon dioxide. The resulting solution is diluted with distilled water (50 ml.), adjusted to pH 9.0 by introduction of gaseous ammonia and filtered to give the objective silver ammonia fluoride solution, of which concentration is 40% as silver fluoride. On application, this solution is diluted with water to 30% as silver fluoride.

EXAMPLE 3

To a solution of ammonium fluoride (14.8 g.) in water (80 ml.) is added silver oxide (22 g.), and the mixture is stirred at 50~60° C. until silver oxide is dissolved. The solution is adjusted to pH 8.5 by addition of aqueous ammonia, filtered, and diluted with water to 30% as silver fluoride.

What is claimed is:

1. A silver ammonia fluoride solution for the prevention and treatment of dental diseases which comprises substantially 25~35% (as silver fluoride) of silver ammonia fluoride and water, of which pH is adjusted to 6.5~9.5.

2. A silver ammonia fluoride solution for the prevention and treatment of dental diseases which comprises substantially 25~35% (as silver fluoride) of silver ammonia fluoride, 1~2% of ammonium fluoride and water, of which pH is adjusted to 6.5~9.5.

3. A process for preparing a silver ammonia fluoride solution which comprises substantially reacting silver fluoride with ammonia in aqueous medium.

4. The process claimed in claim 3, wherein freshly prepared silver fluoride is used without isolation.